US012406641B1

(12) United States Patent
May

(10) Patent No.: US 12,406,641 B1
(45) Date of Patent: Sep. 2, 2025

(54) DRUM ASSEMBLY AND METHOD OF USE

(71) Applicant: Remo, Inc., Valencia, CA (US)

(72) Inventor: James H. May, Valencia, CA (US)

(73) Assignee: REMO, INC., Valencia, CA (US)

( * ) Notice: Subject to any disclaimer, the term of this patent is extended or adjusted under 35 U.S.C. 154(b) by 0 days.

(21) Appl. No.: 19/208,837

(22) Filed: May 15, 2025

Related U.S. Application Data

(60) Provisional application No. 63/648,526, filed on May 16, 2024.

(51) Int. Cl.
*G10D 13/065* (2020.01)
*G10D 13/10* (2020.01)
*G10D 13/20* (2020.01)
*G10D 13/03* (2020.01)

(52) U.S. Cl.
CPC ........... *G10D 13/065* (2013.01); *G10D 13/20* (2020.02); *G10D 13/28* (2020.02); *G10D 13/03* (2020.02); *G10D 13/26* (2020.02)

(58) Field of Classification Search
CPC ...... G10D 13/065; G10D 13/28; G10D 13/20; G10D 13/03
See application file for complete search history.

(56) References Cited

U.S. PATENT DOCUMENTS 3,264,926 A * 8/1966 Belli .................... G10D 13/03 984/150
4,596,176 A * 6/1986 Gauger ................ G10D 13/02 984/150
10,102,833 B1 10/2018 May

* cited by examiner

*Primary Examiner* — Robert W Horn
(74) *Attorney, Agent, or Firm* — Jeffer Mangels; Butler & Mitchell LLP; Brennan C. Swain, Esq.

(57) ABSTRACT

A drum assembly that includes a circular frame member that defines a frame opening therein, an upper drum head member secured to the frame member and spanning the frame opening, a lower drum head member positioned below the upper drum head member, secured to the frame member and spanning the frame opening, and a threaded rod assembly extending between the upper drum head member and the lower drum head member. The threaded rod assembly includes an upper threaded member that is threadingly engaged with the upper drum head member. Rotation of the upper threaded member in a predetermined direction moves the upper drum head member away from the lower drum head member, such that tension is increased in the upper drum head member.

20 Claims, 12 Drawing Sheets

DRUM ASSEMBLY AND METHOD OF USE

CROSS-REFERENCE TO RELATED APPLICATIONS

This application claims the benefit of U.S. Provisional Application No. 63/648,526, filed on May 16, 2024, the entirety of which is incorporated by reference herein.

FIELD OF THE INVENTION

The present invention relates to a tensioning system for a drum head assembly.

BACKGROUND OF THE INVENTION

Monofilament polyester mesh drum heads may be used in electronic drumsets. The polyester mesh drum head may be used as an electronic drum head for triggering sounds from a module as well as a quiet type of drum head for practice on an acoustic drumset. Monofilament polyester mesh material stretches and deflects much more than a standard drum head made from a solid sheet of polyester film. The deflection can be reduced somewhat if the head is made in a two-ply configuration. Two-ply heads, however, may have a rattling sound caused by the hard surface of the mesh vibrating against each other making it noisier than a single ply mesh head. Electronic drumsets generally use mesh drum heads for the "drum" pads whereas "cymbal" pads may be made from rubber, injection molded plastic or a hybrid plastic/metal combination. Some electronic cymbal pads are designed to swivel back and forth, or fully rotate, like a real cymbal when they are struck with a drumstick, mallet, or the like. The rubber pads, injection molded pads, and other electronic cymbals with a metal surface are loud and noisy compared to the mesh drum heads used on the drums.

Drum suspension systems may use a polar array of rubber grommets on the drum's tension rods. This suspension system allows the drum to resonate much longer as the drum is not held rigidly and in one place but instead held loosely in multiple places around the drum. Other suspension systems may suspend the drum from the lugs instead of the tension rods so the drum head can be changed without the drum having to come off the stand. Rope suspension systems that suspend the drum with leather strips with cushioned wrap-around handles so the drums can be held comfortably for long periods of time are also known.

Bass Drum drum heads may be ported to let a large amount of air out rapidly and to allow a microphone or pillow to be placed inside of the drum. Polyester film can be ported without loss of strength at the hole if it is not under a great deal of tension. If a ported drum head is subjected to high tension, then it needs some sort of support around the hole to compensate for the lost material and make it pull evenly in a circular fashion. Grommets and/or adhesives can be placed around a polyester mesh or film hole to redistribute the load so that it pulls evenly from the center. Monofilament mesh material is similar to a solid polyester sheet in regards to a hole being able to be punched, cut out, or melted out without the material tearing across the entire drum head. The mesh material has a lattice structure where each crossing strand is melted together so when a hole is placed in it, it does not continue out of the next melted crossing of strands. The openings are so small that any excess strand or strands that stick out are not noticeable.

Cymbal stands commonly use a threaded post, which goes through the center hole of a cymbal. A felt tube is usually placed over the threaded post below the cymbal and above the cymbal so that it suspends the cymbal and is free to vibrate. A wing nut is placed over the top felt and tightened to the players liking for sustain and to keep it from coming off of the stand. Cymbals come in a variety of sizes with the most common being 14" Hi Hats, 16" Crash, and 22" Ride. Standard cymbals have 3 distinct areas of play, which include the edge, bow, and bell. Electronic cymbal pads may have triggers in these three areas of play.

The background description disclosed anywhere in this patent application includes information that may be useful in understanding the present invention. It is not an admission that any of the information provided herein is prior art or relevant to the presently claimed invention, or that any publication specifically or implicitly referenced is prior art.

SUMMARY OF THE PREFERRED EMBODIMENTS

In accordance with a first aspect of the present invention, there is provided a drum assembly that includes a circular frame member that defines a frame opening therein, an upper drum head member secured to the frame member and spanning the frame opening, a lower drum head member positioned below the upper drum head member, secured to the frame member and spanning the frame opening, and a threaded rod assembly extending between the upper drum head member and the lower drum head member. The threaded rod assembly includes an upper threaded member that is threadingly engaged with the upper drum head member. Rotation of the upper threaded member in a predetermined direction moves the upper drum head member away from the lower drum head member, such that tension is increased in the upper drum head member. The upper drum head member may include an upper opening defined therein that includes an upper threaded receiver, and the upper threaded member is threadingly engaged with the upper threaded receiver. The threaded rod assembly may include a lower threaded member. The lower drum head member may include a lower opening defined therein, and the lower opening may include a lower threaded receiver. The lower threaded member is threadingly engaged with the lower threaded receiver. The upper threaded member is rotatable with respect to the lower threaded member.

One of the upper threaded member and the lower threaded member may include a protrusion portion and the other of the upper threaded member and the lower threaded member may include an axial bore. The protrusion portion is received in the axial bore. The threaded member assembly may include a coupling nut. A threaded portion of the lower threaded member can be threadingly engaged with the coupling nut and the coupling nut is configured to receive a threaded post of a cymbal stand or the like.

The upper drum head member may include an outer circumference portion and the lower drum head member may include an outer circumference portion. The frame member defines a hoop channel that includes a ring member therein. The outer circumference portion of the upper drum head member and the outer circumference portion of the lower drum head member are received in the hoop channel and at least partially surround the ring member. The frame member includes an inner wall, a bottom wall, an outer wall and an upper wall that cooperate to at least partially define the hoop channel. A gap is defined between the inner wall and the upper wall, and the upper drum head member and lower drum head member extend through the gap an into the hoop channel. A method of securing the outer circumference portions of the upper and lower drum head members in the frame member is also within the scope of the invention.

The lower drum head member may include a sleeve assembly that includes a seat portion with the upper threaded member seated on the seat portion. The upper threaded member is rotatable with respect to the sleeve assembly. The lower drum head member includes a lower opening defined therein, and the lower opening includes at least a portion of the sleeve assembly extending therethrough. The upper threaded member may be tubular and include an axial opening extending therethrough. A hi-hat pull rod path is defined through a central opening in the sleeve assembly and through the axial opening of the upper threaded member. The hi-hat pull rod path is configured to receive a hi-hat pull rod. The upper threaded member may include a lateral opening extending through a wall thereof, whereby the lateral opening is configured to receive a screw and to secure the upper threaded member to the hi-hat pull rod.

The upper threaded member may include an internally threaded sleeve thereon that includes a threaded opening defined in a wall thereof. The upper threaded member may include a lateral opening extending through a wall thereof, and a screw or other threaded member may extend through the threaded opening in the wall of the internally threaded sleeve and through the lateral opening in the upper threaded member. The screw is configured to secure the upper threaded member to the hi-hat pull rod.

The upper drum head member includes an outer circumference portion and the lower drum head member includes an outer circumference portion. The frame member includes first and second U-shaped hoops. The outer circumference portion of the upper drum head member is received in and secured in an interior of the first U-shaped hoop, the outer circumference portion of the lower drum head member is received in and secured in an interior of the second U-shaped hoop. The first and second U-shaped hoops are secured together by a securing member.

In accordance with another aspect of the present invention, a method of providing tension on an upper drum head member of a drum assembly, the method including obtaining the drum assembly, where the drum assembly includes the upper drum head member and a lower drum head member positioned below the upper drum head member. The upper and lower drum head members are secured to a frame member and span a frame opening. A threaded rod assembly extends between the upper drum head member and the lower drum head member, and the threaded rod assembly includes an upper threaded member that is threadingly engaged with the upper drum head member. The method includes rotating the upper threaded member, such that the upper drum head member moves away from the lower drum head member, whereby tension is increased in the upper drum head member. The threaded rod assembly includes a lower threaded rod that is matingly engaged with the upper threaded rod, and the upper threaded rod is rotated with respect to the lower threaded rod. The lower drum head member includes a sleeve assembly, where the upper threaded rod is seated on the sleeve assembly, and the upper threaded rod is rotated with respect to the sleeve assembly.

The present invention also includes a drum assembly with a circular frame member that defines a frame opening therein, an upper drum head member secured to the frame member and spanning the frame opening, a lower drum head member positioned below the upper drum head member, secured to the frame member and spanning the frame opening, and a threaded rod assembly extending between the upper drum head member and the lower drum head member. The threaded rod assembly extends downwardly through a lower opening defined in the lower drum head member, a nut member is received on the threaded rod assembly below the lower drum head member, and rotation of the nut member against the lower drum head member pulls the upper drum head member downwardly. The drum assembly may include a plate member positioned above the upper drum head member, where the plate member includes an opening defined therethrough. The threaded rod assembly includes a head, and the threaded rod assembly extends through the opening defined in the plate and the head contacts the plate. The head of the threaded rod assembly may be seated in an indentation defined in the plate member.

The drum head assemblies discussed herein may be used in practice drum systems, arrangements or kits or in electronic drum systems, arrangements or kits. In an embodiment where the double headed drum incorporates a threaded nut or receiver into the mesh membrane of both heads then structural support may be created between the two drum heads without any additional tensioning, as the threaded rod is not actively pushing against one membrane to cause movement in the other. For example, the mesh discussed in U.S. Pat. No. 10,102,833, the entirety of which is incorporated by reference herein, may be used. Tension can be created on each of the drum heads by pushing the two mesh drum heads together or by pulling the two mesh heads apart. Opposing tension is created by pulling the two mesh heads in opposite directions creating a conical shape to the mesh membrane and thus taking on a similar shape to that of a cymbal. Additionally, a small rebound disc may be installed on the post to create a quiet sound with the look and feel of a cymbal bell. A similar means of tension can be created by having a turnbuckle with left and right threads between the two drum heads, which forces each head in opposite directions. This turnbuckle system may be a stand-alone type or can be incorporated into the cymbal or drum head assembly stand. Compression tension can be created by placing a cap screw through a reinforced hole in one mesh head and screwing it into a nut, a threaded insert, or a weld nut attached to, or underneath, the opposing mesh head. Other compression means can be applied by tension from a cord, rope, wire or similar between the two mesh heads. A mesh drum head that is attached to a drumshell creates a similar suspension system whereby the mesh allows the drum to vibrate freely because of its elasticity and where it contacts the shell in a full 360-degree fashion to evenly distribute the weight and vibrations of the drumshell.

Drum practice pads come in many styles. Some have a rubber playing surface glued onto a wood or metal base and some have a drum head made from polyester film or polyester mesh materials. Polyester film pads produce a lot of noise when the stick strikes the head. Gum rubber pads are generally preferred over pads with heads because they have a fast rebound surface and are quiet, so as to not disturb others nearby. If the base is made from steel and has a soft natural rubber pad on top then it has a very fast rebound and is very quiet as the natural rubber gets compressed and spreads out at the point of contact. Mesh drum heads also are quiet like the gum rubber pads but unlike the gum rubber pad, they can be tuned or tensioned to get a specific bounce and feel. The bounce characteristics are important, especially to professional players just as the bounce characteristics of a basketball would be to a professional player. A higher bounce is achieved with a basketball by increasing the air pressure inside. A rapid rebound is generally achieved with a polyester drum head by tensioning it tighter. A mesh head however is made from a material that has a large amount of stretch so when it is tensioned on a large drum, e.g., 14" diameter and higher, it does not have a rapid rebound. It will be appreciated that to get a rapid rebound with a mesh material it may have a bridge of sorts to, in essence, reduce the diameter of the membrane. Thus, an improved practice pad is created whereby a player may adjust the tension and feel of the membrane to his or her liking and have the resultant sound at a minimal level, so as to not disturb others nearby. The present invention may be likened to a "mesh cymbal" that has a hole for a stud or rod to protrude up and out, as well having a conical shape, when tensioned.

It will be appreciated that electronic drumsets often use a sound module to output various drum sounds such as a snare drum and crash cymbal to speakers, headphones, or ear buds. Mesh heads are generally used on the drums, which are quiet and tunable. Electronic cymbal pads are loud and noisy and do not match the lower volume level of the mesh head pads so there is a need for a mesh cymbal pad where the noise level of the entire set is low and consistent around the entire set and thus can be used for quiet practice or on stage without isolation booths or other recording restrictions, such as vocal microphones that pick up loud contact noises. Thus, mesh is a material or component that can be used in the present invention, to keep sound low when in use.

The present invention includes a drum assembly with a frame that includes an upper frame opening and a lower frame opening, an upper drum head member that at least partially covers the upper frame opening, a lower drum head member that at least partially covers the lower frame opening, and a threaded rod assembly extending between the upper drum head member and the lower drum head member. The threaded rod assembly is threadingly engaged with at least one of the upper drum head member and the lower drum head member. The upper drum head member may include an upper membrane with an upper opening defined therein. The upper opening includes an upper threaded receiver. The lower drum head member includes a lower membrane and a lower opening defined therein. The lower opening includes a lower threaded receiver. The threaded rod assembly is threadingly engaged with and extends between the upper threaded receiver and the lower threaded receiver. The upper membrane may be a mesh membrane and wherein the lower membrane may be a mesh membrane.

The upper drum head member may be an upper membrane that includes an upper opening defined therein. The upper opening may include a receiver or sleeve member. The lower drum head member may be a lower membrane that includes a lower opening defined therein. The lower opening includes a lower threaded receiver. The threaded rod assembly may be threadingly engaged with the lower threaded receiver and extend upwardly and engage the upper receiver member. Rotation of the drum assembly in a first direction may move the lower drum head downwardly and the threaded rod assembly may push the upper membrane upwardly. This arrangement may be reversed.

The threaded rod assembly may include an upper threaded rod that is threadingly engaged with the upper threaded receiver and a lower threaded rod that is threadingly engaged with the lower threaded receiver and the upper threaded rod may be rotatable with respect to the lower threaded rod, whereby the upper membrane can be tensioned independently of the lower membrane. One of the upper or lower threaded rod or member may include a receiving opening or bore that mates with a protrusion portion on the other of the upper or lower threaded rod, such that the upper threaded rod is rotatable with respect to the lower threaded rod. The threaded rod assembly may include a cap member secured thereon. The cap member may be positioned above the upper drum head member. The cap member may include a metal plate covered by a rubber disc. The drum assembly may include an edge or band member positioned above an upper surface of the frame.

The present invention includes a drum assembly with a frame that includes an upper frame opening and a lower frame opening, an upper drum head member that at least partially covers the upper frame opening, a lower drum head member that at least partially covers the lower frame opening, and a threaded rod assembly extending between the upper drum head member and the lower drum head member. The threaded rod assembly extends downwardly through a lower opening defined in the lower drum head member. A nut member is received on the threaded rod assembly. Rotation of the nut member against the lower drum head member (or a washer or surface thereon) pulls the upper drum head member downwardly and/or pulls the upper and lower drumhead members toward one another, thereby tensioning or increasing the tension on one or both of the membranes. The upper drum head member may include a plate thereon and/or an opening defined therethrough. The threaded rod assembly may include a head, where the threaded rod assembly extends through the opening defined in the plate and the head contacts the plate such that the head pulls the plate (and membrane) downwardly when the nut member is rotated in the appropriate direction.

The present invention may include a hi-hat drum assembly that includes a frame that includes an upper frame opening and a lower frame opening, an upper drum head member that at least partially covers the upper frame opening, a lower drum head member that at least partially covers the lower frame opening, a threaded rod assembly extending between the upper drum head member and the lower drum head member. The threaded rod assembly is threadingly engaged with at least one of the upper drum head member and the lower drum head member. A pull rod extends through an axially opening defined through the threaded rod assembly or the upper threaded member thereof. The pull rod extends through a lower threaded receiver or a lower sleeve member associated with the lower drum head member and a lower cymbal that is positioned below the lower drum head member. The threaded rod assembly may include an upper threaded rod that is threadingly engaged with an upper threaded receiver and a lower threaded rod that is threadingly engaged with a lower threaded receiver. The upper threaded rod is rotatable with respect to the lower threaded rod, whereby the upper membrane can be tensioned independently of the lower membrane.

It will be appreciated that the upper and lower drum heads together with the frame member (and without the threaded rod or threaded member assembly) may be referred to herein as a pre-tensioned drum assembly. In use, it is contemplated that a pre-tensioned drum assembly may be sold without the threaded rod assembly and that a full drum assembly that includes the pre-tensioned drum assembly and the threaded rod assembly may also be sold. A consumer may purchase the full drum assembly first and then, after the first is worn out, the consumer may then purchase the pre-tensioned drum assembly and pair it with the previously purchased threaded rod assembly.

Because the mesh cymbal is suspended by the bottom side or lower drum head member and reinforced with the topside mesh or upper drum head member through the post connection or threaded member assembly, the drum head or drum assembly can recover back to its original position quickly and with a minimal amount of deflection, making it move far less than a loosely held cymbal of the same diameter. In other words, the edge of the mesh cymbal preferably includes a soft rubber tube or component that may have a steel ring embedded into it. The assembled ring may then be suspended on the drum bearing edge with a soft silicone rubber to absorb the heavy impact at the edge of the drum shell and with a fast rebound associated with a steel and rubber combination.

The present invention also includes the ability to print graphics and/or indicia, such as a logo, cymbal graphic, lettering or symbols or indicia related to using the practice drum or cymbal, on at least one of the mesh, plies or layers. A graphic image may be printed on the bottom or lower side of the upper mesh or layer, which prevents any ink or related material of the indicia from being contacted by the drum sticks when being used. Due to the semi-transparent or opaque quality of the mesh, the indicia is visible even when printed on the lower or non-play side of the mesh or layer.

DETAILED DESCRIPTION OF THE PREFERRED EMBODIMENTS

Figure 1:
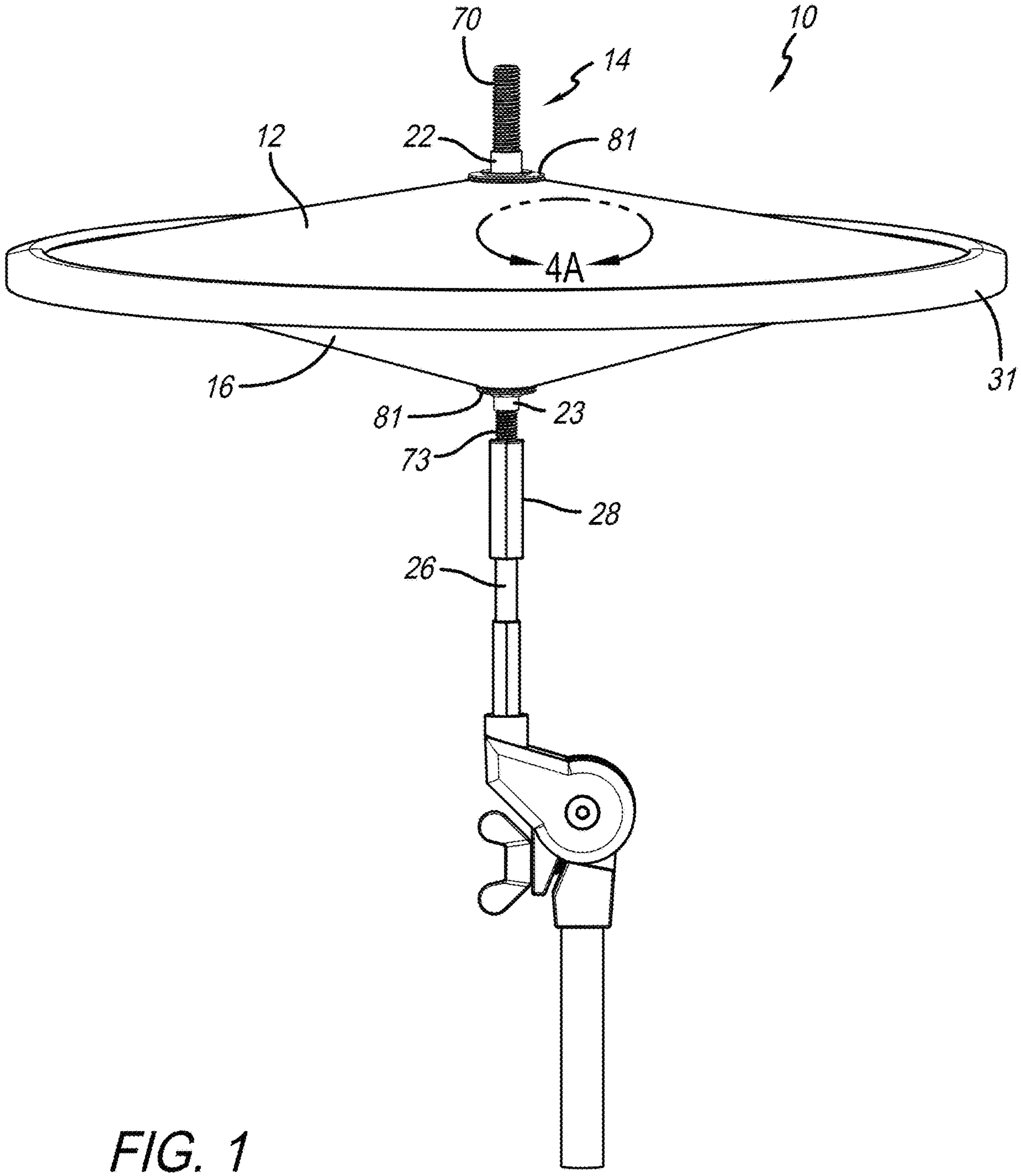
FIG. 1 is a perspective view of a drum assembly in accordance with a preferred embodiment of the present invention.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are references to the same embodiment; and, such references mean at least one of the embodiments. If a component is not shown in a drawing then this provides support for a negative limitation in the claims stating that that component is "not" present. However, the above statement is not limiting and in another embodiment, the missing component can be included in a claimed embodiment.

Reference in this specification to "one embodiment," "an embodiment," "a preferred embodiment" or any other phrase mentioning the word "embodiment" means that a particular feature, structure, or characteristic described in connection with the embodiment is included in at least one embodiment of the-disclosure and also means that any particular feature, structure, or characteristic described in connection with one embodiment can be included in any embodiment or can be omitted or excluded from any embodiment. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others and may be omitted from any embodiment. Furthermore, any particular feature, structure, or characteristic described herein may be optional. Similarly, various requirements are described which may be requirements for some embodiments but not other embodiments. Where appropriate any of the features discussed herein in relation to one aspect or embodiment of the invention may be applied to another aspect or embodiment of the invention. Similarly, where appropriate any of the features discussed herein in relation to one aspect or embodiment of the invention may be optional with respect to and/or omitted from that aspect or embodiment of the invention or any other aspect or embodiment of the invention discussed or disclosed herein.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks: The use of highlighting has no influence on the scope and meaning of a term; the scope and meaning of a term is the same, in the same context, whether or not it is highlighted.

It will be appreciated that the same thing can be said in more than one way. Consequently, alternative language and synonyms may be used for any one or more of the terms discussed herein. No special significance is to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

It will be appreciated that terms such as "front," "back," "top," "bottom," "side," "short," "long," "up," "down," "aft," "forward," "inboard," "outboard" and "below" used herein are merely for ease of description and refer to the orientation of the components as shown in the figures. It should be understood that any orientation of the components described herein is within the scope of the present invention.

Figure 2:
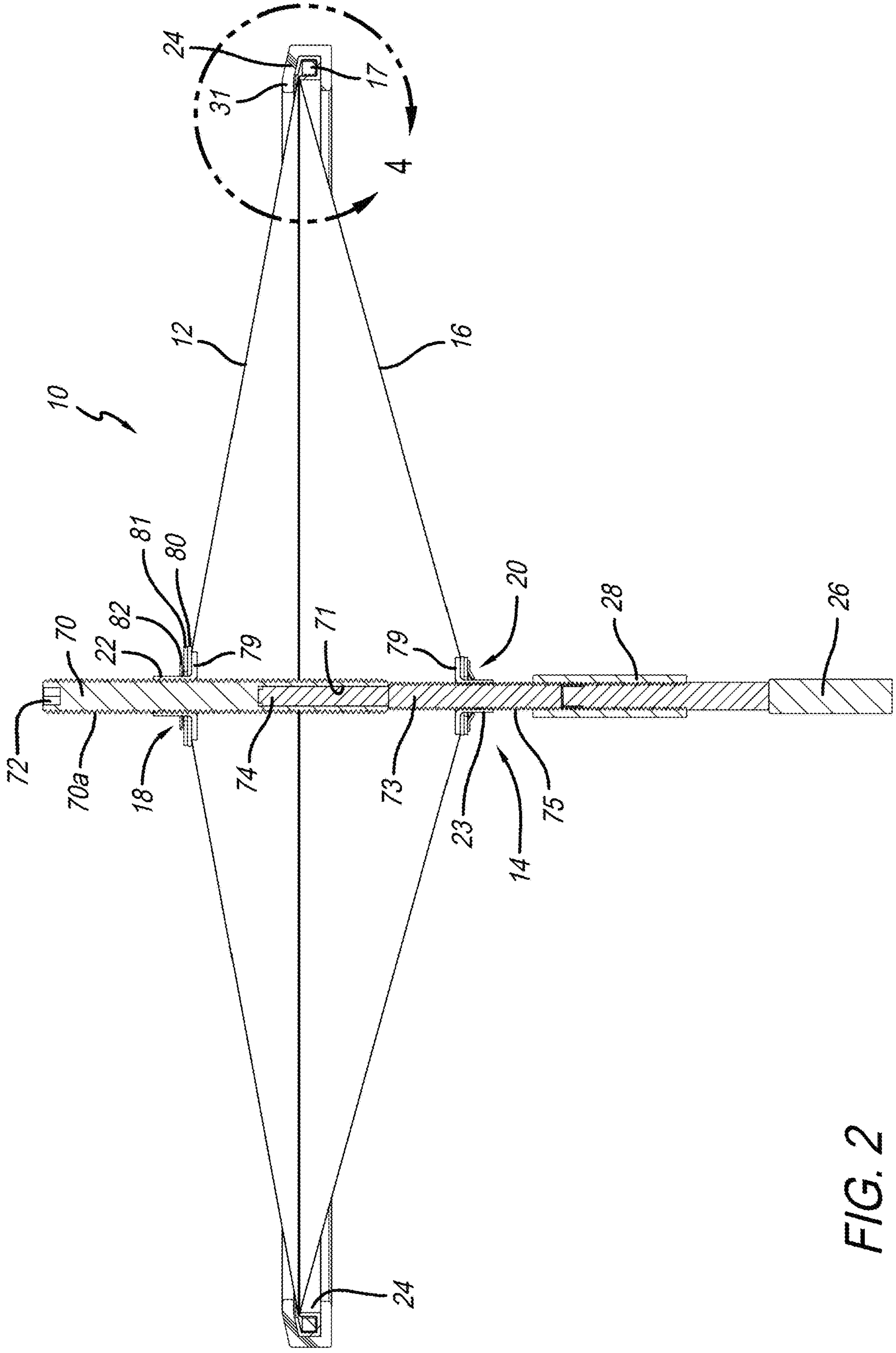
FIG. 2 is a cross-sectional view of the drum assembly.
Figure 3:
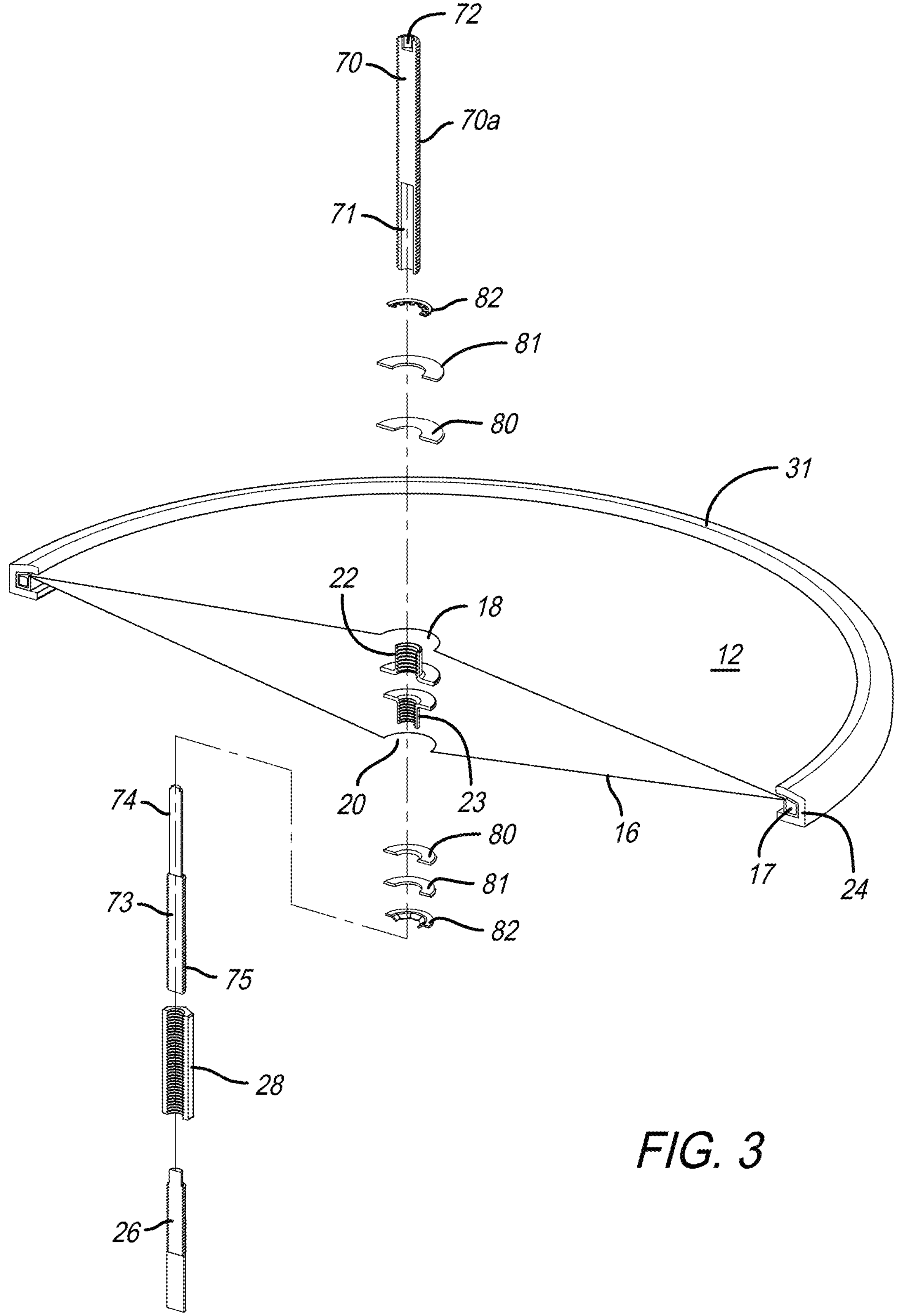
FIG. 3 is an exploded cross-sectional view of the drum assembly.

FIGS. 1-5 show a first embodiment of a drum assembly 10 that includes a top or upper drum head member 12 and a bottom or lower drum head member 16. In a preferred embodiment, As shown in FIG. 2, a threaded member assembly or rod 14 extends from the lower drum head member 16 to the upper drum head member 12. The threaded rod assembly 14 may extend through an upper opening 18 in the upper drum head member 12 and a lower opening 20 in the lower drum head member 16, as shown in FIG. 3. Generally, the threaded rod assembly 14 mates with a weld nut or lower threaded receiver 23 on the lower drum head member 16 and extends upwardly to and mates with a weld nut or upper threaded receiver 22 on the upper drum head member 12. It will be appreciated that the threaded rod assembly may be a single threaded rod (as shown for example in FIG. 9 below) or a plurality of threaded members or rods as described in the current and other embodiments discussed herein. The threaded rod assembly 14 provides the ability to place tension on one or both of the upper drum head member 12 and/or lower drum head member 16. The frame member 24 defines a frame opening 19, as shown in FIG. 3. It will be appreciated that FIG. 3 shows the upper and lower drum head members spaced apart from one another as if they were in the use position (with the threaded rod assembly extending therebetween). However, this is only for illustrative purposes. Without the threaded rod assembly extending between the upper and lower drum head assemblies the membranes would extend about straight across and flat within the frame opening. The upper and lower threaded receivers are likely touching when the threaded rod assembly is not included therein. Same with FIG. 8.

FIGS. 1-3 show the drum assembly 10 with top and bottom or upper and lower mesh drum heads or drum head members 12 and 16 the outer circumferences of which are contained in the frame member 24 or hoop. In another embodiment, the drum heads may be attached to the frame member by another method, such as stapling or the like. Any method of securing the upper and lower drum head members to the frame member 24 is within the scope of the invention. For example, adhesive, glue, welding, pins, stitching, snaps or any other securing method is within the scope of the invention. In a preferred embodiment, the two drum heads include or comprise mesh membranes (see FIG. 4A) that are secured by or attached to the frame member 24. It will be appreciated that non-mesh drum heads are also within the scope of the invention. For example, solid sheet polyester film membranes or drum heads may be used.

Figure 4:
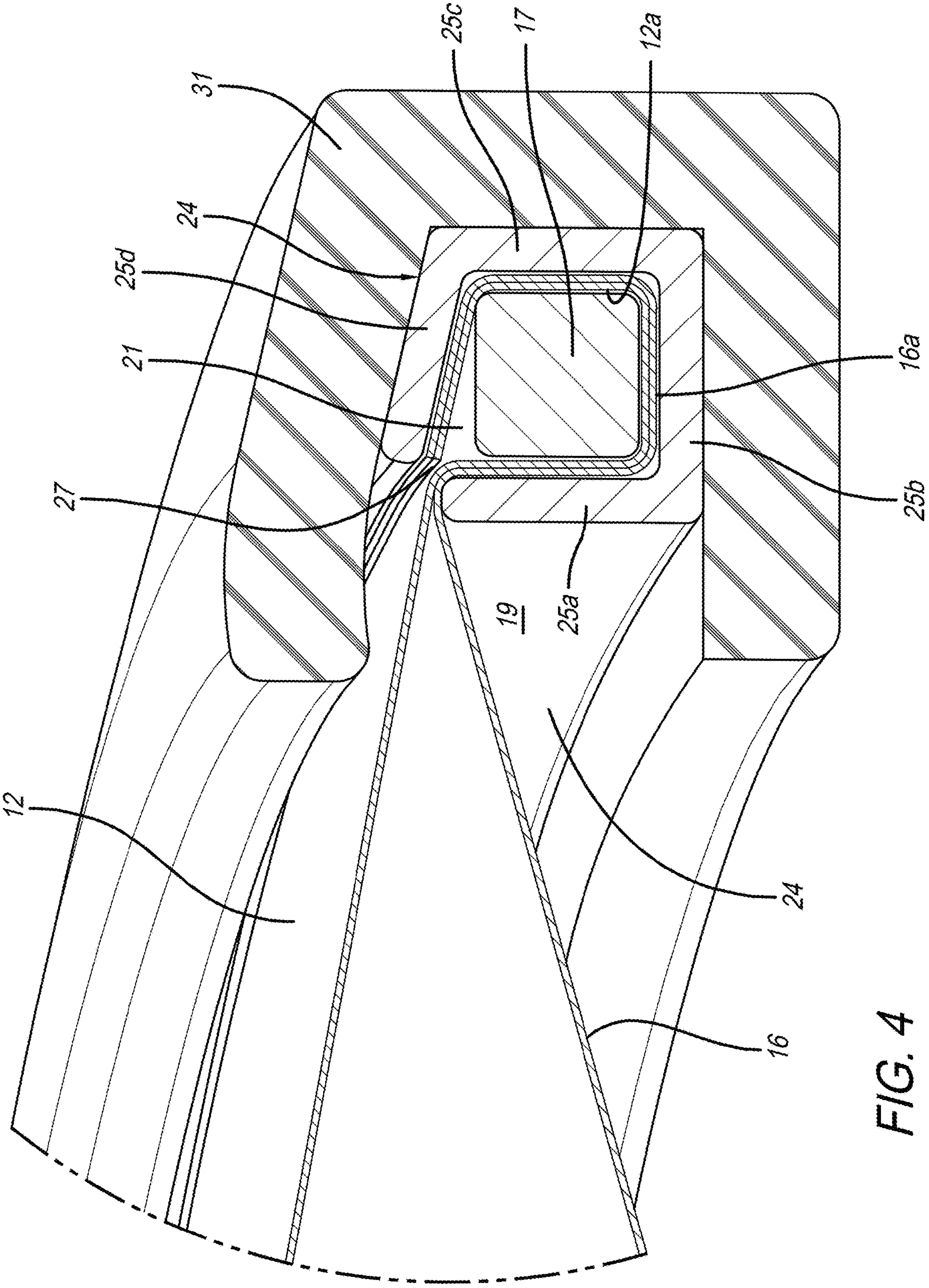
FIG. 4 is a cross-section taken along line 4-4 of FIG. 2.

As shown in FIG. 4, in a preferred embodiment, the frame member 24 may be a hoop or crimped hoop that defines a hoop channel 21 and contains a ring member 17 therein. The upper drum head member 12 defines an outer circumference portion 12*a* and the lower drum head member 16 defines an outer circumference portion 16*a*. As is best shown in FIG. 4, the outer circumference portions 12*a* and 16*a* are secured within the hoop channel 21 and at least partially around the ring member 17. In manufacturing, the outer circumference portions 12*a* and 16*a* are positioned on the hoop (that becomes the frame member 24) before crimping or bending and when it is a flat piece of aluminum or the like (and still in the form of a hoop or circle). The ring member 17 is placed on the outer circumference portions 12*a* and 16*a*. The flat hoop is then crimped or bent around the ring member 17, such that the hoop takes the shape shown in FIG. 4. In this shape, the hoop or frame member 24 includes an inner wall 25*a*, bottom wall 25*b*, outer wall 25*c* and upper wall 25*d*. A gap 27 is defined between the free end of the inner wall 25*a* and the free end of the upper wall 25*d*. The upper and lower drum head members 12 and 14 extend through the gap 27 and into the hoop channel 21. The outer circumference portions of the upper and lower drum head members are crimped, squeezed or secured between the outer surface of the ring member 17 and the inner surface of the frame member 24 to secure the upper and lower drum heads in position. In a preferred embodiment, an elastomeric, silicone rubber or other soft material (referred to herein as an edge member or band member 31) at least partially surrounds or is secured on or over the frame member 24 or crimped hoop member. When played, the band or edge member 31 reduces the contact noise of the stick when playing the edge of the drum assembly 10, may provide a good bounce, and dampen the hoop member from vibration. Any type of rubber, elastomeric or soft material is within the scope of the present invention.

In a preferred embodiment, the weld nut or upper threaded receiver 22 is attached at or around the center of the upper mesh membrane 12 and the lower threaded receiver 23 is attached at or around the center of the lower mesh membrane 16 and the threaded rod assembly 14 is secured or threaded within the upper and lower threaded receivers 22 and 24. The threaded rod 14 couples the two mesh membranes together. As is shown in FIGS. 2 and 3, a series of components may be included at or in association with the upper opening 18 and lower opening 20 and the upper threaded receiver 22 and the lower threaded receiver 23. This components may include an adhesive 80 (such as a PUR adhesive), a washer 81 (such as a fender washer) and an external retaining ring 82.

Figure 4A:
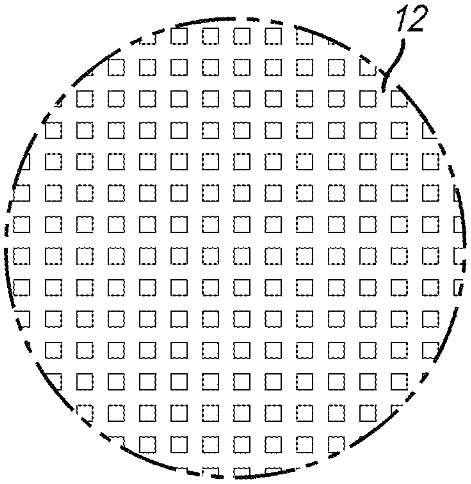
FIG. 4A is a detail view taken along line 4A-4A of FIG. 1 showing mesh.

In use, the upper membrane or drum head member 12 may be played with a drumstick, mallet, or the like and the lower membrane or drum head member 16 may provide a flexible and self-righting support for the drum frame assembly. In a preferred embodiment, the upper membrane 12 is one or more plies of polyester mesh, as shown in FIGS. 4 and 4A. When played, the mesh provides little to no rattling sound. The lower membrane 16 may be a one or more ply configurations (or may be another material, such as wood) so that the entire frame and/or assembly is more rigid than is only a single or upper ply was included. However, this is not a limitation on the present invention and the upper and lower drum head members may be single ply or multi-ply. The bottom two-ply drum head member may have little to no rattle sound because it is not struck with the drumstick. It will be appreciated that one of the functions of the lower drum head member 16 is to steady and rapidly rectify the frame's position after impact and support the top mesh through a connection tube, rod, bracket, or the like.

As shown in FIGS. 1-2, in a preferred embodiment, the drum frame assembly is connected to the threaded post 26 of a stand, such as a standard cymbal stand, via a coupling nut or coupling member 28. For example, many cymbal stands have a threaded post size of 8 mm×1.25 mm. A longer 8 mm×1.25 mm threaded post may be attached to the stand using an 8 mm×1.25 mm coupling nut 28. The threaded post extension 26 allows for the drum assembly 10 (via the threaded post assembly 14) to be threaded or connected directly to the lower drum head mesh membrane where the membrane may have one or more threaded weld nuts glued or mechanically fastened to the membrane, making a connection between the upper and lower mesh members to the threaded post assembly 14.

Figure 5:
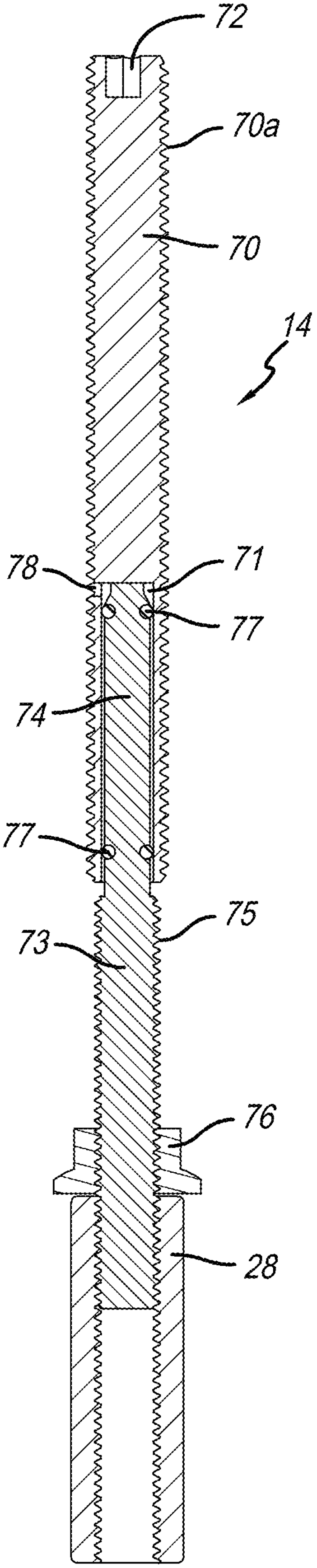
FIG. 5 is a cross-section of the threaded member assembly.

As is best shown in FIGS. 2 and 5, in a preferred embodiment, the threaded post assembly 14 includes the internally threaded coupling nut 28, a headless screw or upper threaded member 70 with external threads 70*a* and a bore 71 axially defined in the lower end thereof. The upper threaded member 70 may also include a tool receiver 72, such as an allen key receiver defined in the top end thereof. The threaded post assembly 14 may also include a lower threaded member 73 that includes a non-threaded protrusion portion 74 that is received in the bore 71 of the upper threaded member 70 and a threaded portion 75 that is received in and threadedly engages the internally threaded coupling nut 28. A flange nut 76 may be threaded onto the threaded portion 75 and against the coupling nut 28 to help maintain the threaded assembly in the desired position. In a preferred embodiment, the protrusion portion 74 of the lower threaded member 73 may include one or more O-rings 77 thereon for engaging the inner surface of the bore 71 and to help eliminate any metal to metal rattling sounds between the upper and lower threaded members during play. The upper threaded member 70 may also include a vent hole 78 defined therethrough that communicates the bore 71 and the exterior of the upper threaded member 70 and is positioned above the O-rings that allows the air to escape as the O-rings create a seal within the bore 71. FIG. 5 does not show the threaded post extension or upper portion 26 of the cymbal stand (which is shown in FIG. 2), threaded into the lower opening of the coupling nut 28.

As shown in FIG. 2, the upper threaded rod or member 70 with the receiving opening or bore 71 to match the dog point or protrusion portion 74 of the lower threaded member 73 or dog point screw is threaded through the upper threaded receiver 22 of the upper drum head member 12. The upper threaded member 70 receives and rests on the protrusion portion 74 or post of the dog point or lower threaded member 73. To adjust the deflection of the upper membrane or drum head member 12 and the tension thereon, the upper threaded member 70 is rotated, for example with an allen key in the tool receiver 72. In this embodiment, the upper threaded member 70 turns separately from or rotates with respect to the lower threaded member 73 due to the upper threaded member 70 resting on the protrusion portion 74 (or the protrusion portion 74 being received in the bore 71. As a result, due to the threaded relationship between the threads 70*a* of the upper threaded member 70 and the upper threaded receiver 22, when the upper threaded member 70 is rotated clockwise, the upper membrane or drum head member 12 travels upwardly, thus placing more tension on the upper drum head member. An advantage to this embodiment is it provides a single top-side point for tuning or creating the tension. It will be appreciated that the protrusion portion 74 and receiving opening or bore 71 may be reversed between the upper and lower threaded rods. Any arrangement that allows tensioning to one of the upper and lower drum head members without tensioning on the other of the upper and lower drum head members is within the scope of the present invention. In another embodiment, tensioning of both the upper and lower drum heads is together (pushing them apart or closer together) is within the scope of the invention.

To mount the upper and lower drum heads together with the frame assembly onto the threaded rod assembly 14, the entire upper and lower drum heads together with the frame assembly can be rotated onto the threaded rod assembly 14, thus threadedly engaging the upper threaded receiver 22 with the upper threaded member 70 and the lower threaded receiver 23 with the lower threaded member 73. Then, the upper threaded member 70 can be rotated (e.g., with an allen key) to create the desired tension in the upper drum head member 12. This may be referred to as moving or tensioning the upper drum head member from a first tension or position to a second tension or position. The bottom mesh drum head provides a suspension system for the drum assembly, as well as receives additional leverage support from the top mesh head. The threaded rod assembly 14 may also be threaded through the upper and lower threaded receivers 22 and 23 and then the lower end of the threaded rod 14 may be threaded into the coupling member 28 (which may already be on the threaded post extension 26) to place the drum assembly 10 in position to be used. By placing the threaded rod 14 between the upper and lower receiver members 22 and 23, tension is provided on the upper and lower drum head members 12 and 16, which reduces deflection when striking the upper drum head member 12 compared to a drum with the same diameter frame.

Similar to other embodiments herein, a hole is placed in the upper membrane or drum head member 12 for the stem of the weld nut or upper threaded receiver 22 to pass through. The threaded receiver may be glued or otherwise secured directly to the mesh material or membrane as a connection point for the threaded post. Weld nuts or upper and lower threaded receivers may have a large base 79 which acts like a fender washer to spread the force out around the hole in the membrane. A structural adhesive, such as a reactive polyurethane, may be used to hold the mesh material to the metal weld nut or insert.

Figure 6:
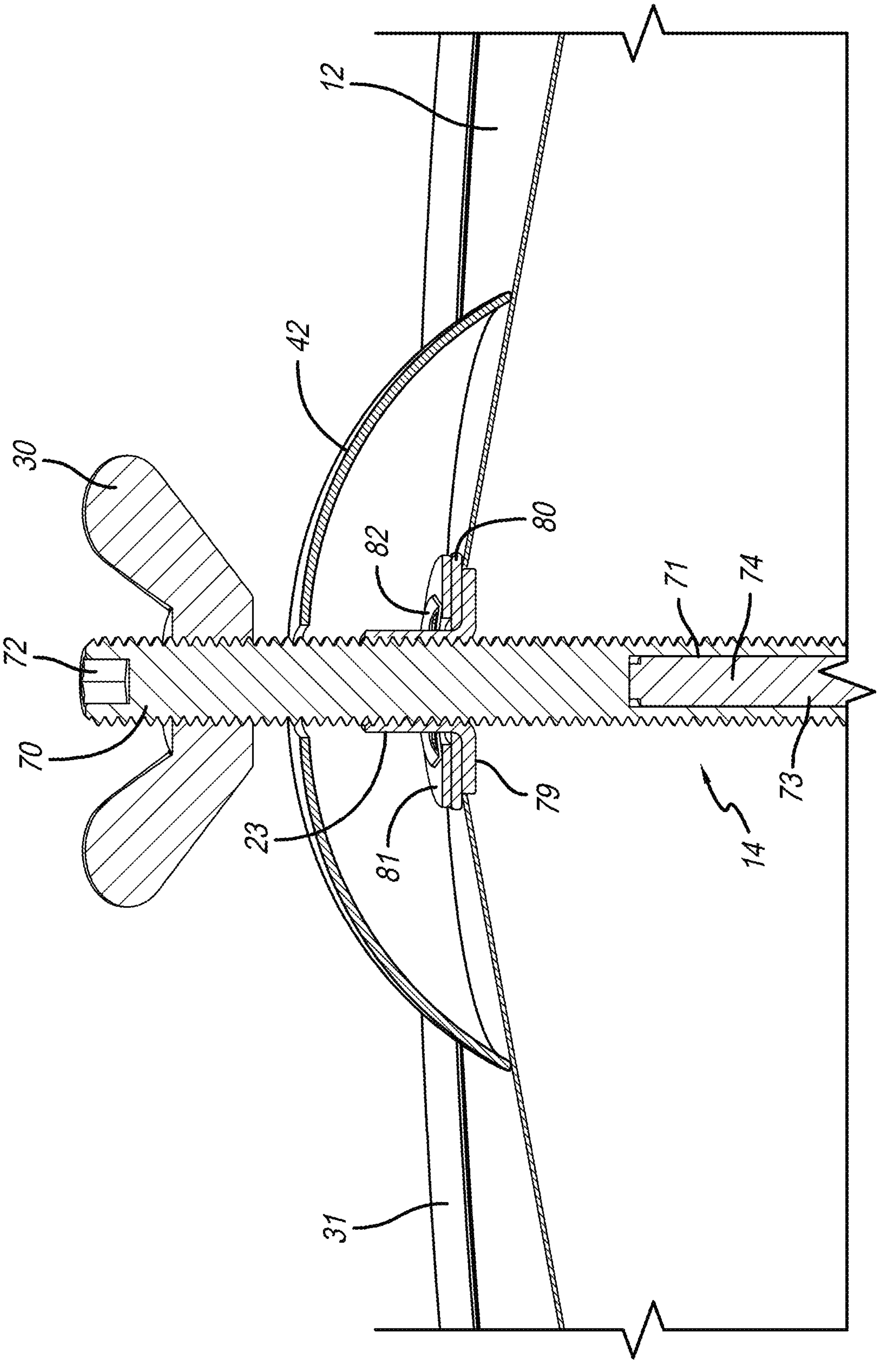
FIG. 6 is a cross-section of a portion of the drum assembly with the addition of a dome member.

FIG. 6 shows another embodiment of the present invention or an addition to the embodiment shown in FIGS. 1-5, but where the drum head assembly 10 may be used as a ride cymbal assembly or use as a practice or electronic cymbal. In a preferred embodiment, the upper mesh membrane 12 is pulled or tensioned upward (via the threaded member assembly 14, creating a cone shape which emulates the bow of a cymbal. The bell may be provided by including a bell member or cap member 42 (e.g., a metal cap covered with rubber disc) onto the center post, threaded member assembly 14, upper threaded member 70 or headless screw. The cap member 42 may be threaded onto the upper threaded rod or member 70. The cap member 42 may or may not contact the upper membrane or upper drum head member 12. In other words, the bell may be provided by adding a conical or flat steel plate with a natural rubber disc on the protruding stud. An advantage to adding the rubber disc to the stud is that it makes a solid connection to the stand and is independent of the mesh head. Supplemental tension on the upper drum head mesh may be created by the cap member 42 or metal dome being secured on the headless screw or upper threaded member 70 and tensioning it with the wingnut 30. This creates downward tension in addition to the upward tension provided by the upper threaded member. The cap member has an added benefit of making the conical mesh emulate the dome or bell of a real cymbal thus improving the overall appearance. The cap member can be made from a rebounding rubber or have a rubber coating applied to metal. It can also be used as a holding mechanism for an electronic trigger or sensor or as a housing area for a battery powered wireless trigger or sensor system.

As shown in FIG. 6, one or more wing nuts 30 may be used to stabilize the cap member 42. Wing nuts may also be used at the lower end of the threaded member assembly to stabilize the bottom side of the drum head assembly and lock or secure the coupling nut 28 and threaded rod 14 in place so that when the drum is played or struck, the entire system is secured. The flange nut 76 shown in FIG. 5 serves a similar purpose. Wing nuts, flange nuts or the like may be used to secure the coupling nut 28 in place and secure the threaded rod 14 and other components of the threaded member assembly. This helps hold the threaded connections in place when playing the drum.

Figure 7:
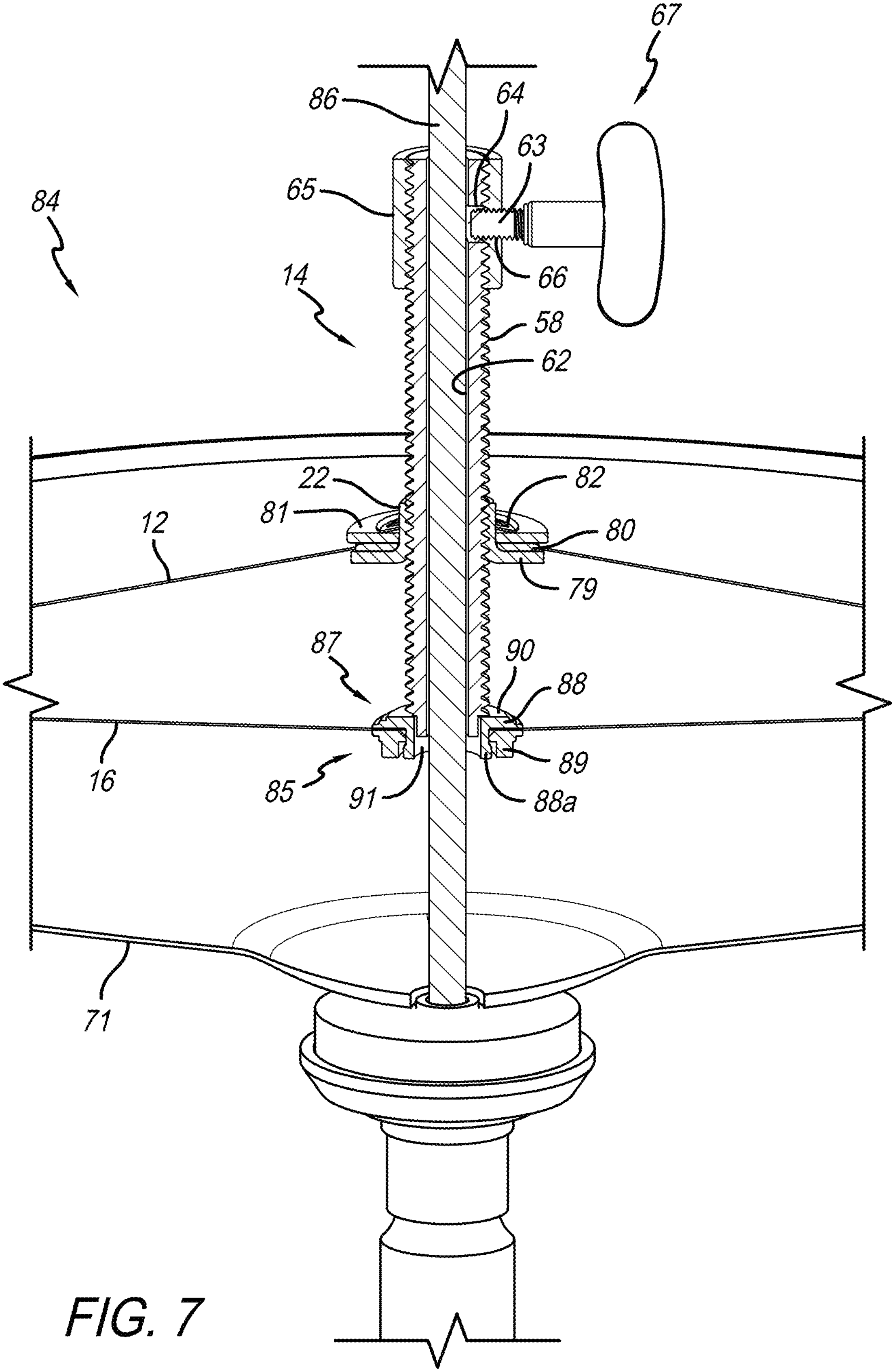
FIG. 7 is a cross-section of a high hat drum assembly in accordance with a preferred embodiment of the present invention.
Figure 8:
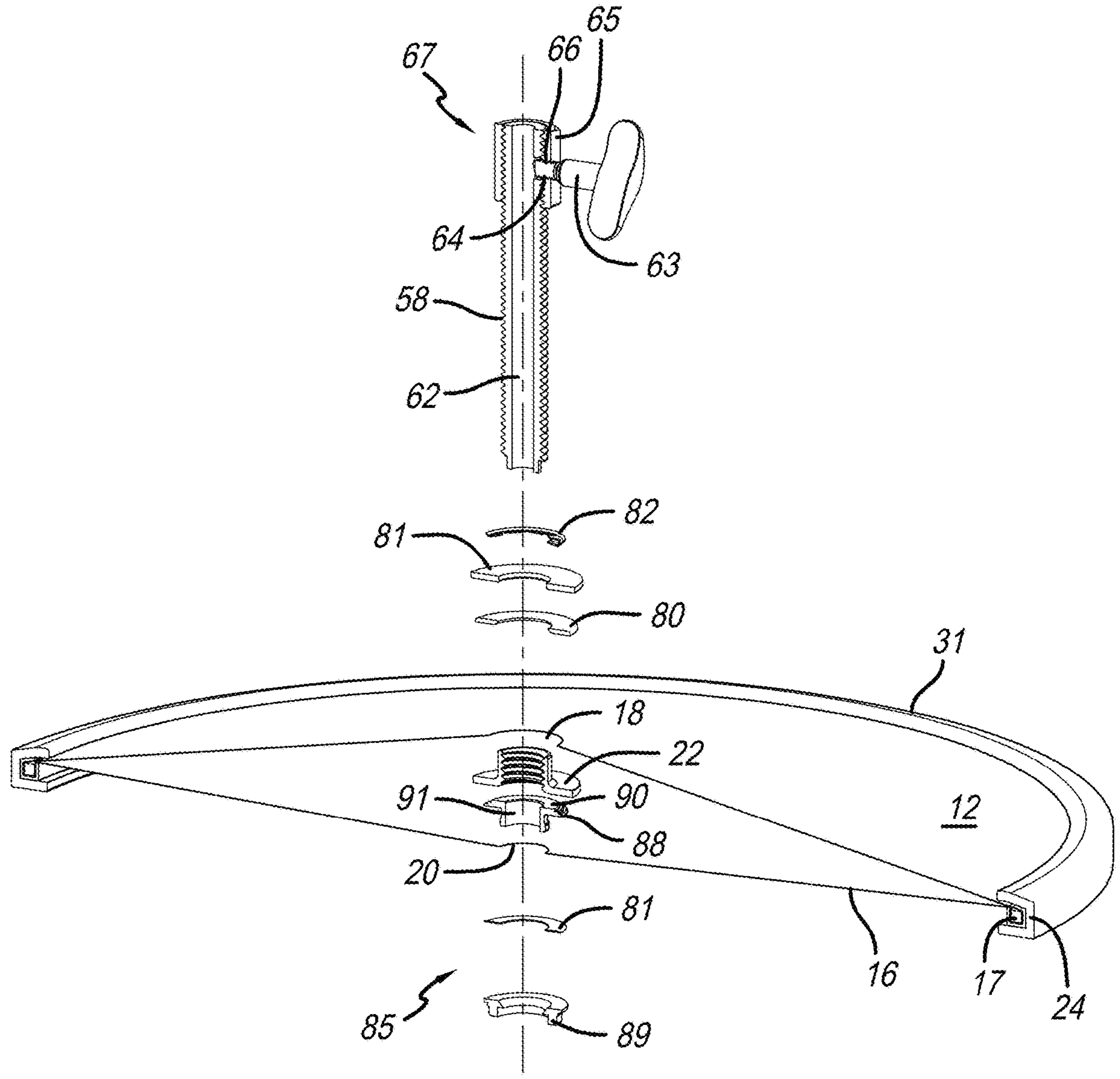
FIG. 8 is an exploded cross-section of the high hat drum assembly.

FIGS. 7-8 show another embodiment of the present invention where a drum assembly 84 is configured to operate in a hi-hat assembly. The embodiment shown includes upper threaded receiver 22 on the upper drum head member 12 and a sleeve assembly 85 with the lower opening 20 in the lower drum head. The upper threaded receiver 22 and the sleeve assembly 85 provide upper and lower points of tensioning of the upper and lower drum heads 12 and 16. The threaded member assembly 14 is different in this embodiment and allows the pull rod 86 of a hi-hat stand to pass therethrough. The threaded member assembly 14 includes a threaded post or upper threaded member 58 and the sleeve assembly 85. The upper threaded member 58 mates with the upper threaded receiver 22. The upper threaded member 58 is essentially a sleeve and includes an axial opening 62 extending therethrough.

The sleeve assembly 85 may be a snap grommet 87 (for example, as is used with tarps) that includes an upper portion 88 and a lower portion 89 that are snap fitted together. A sleeve portion 88*a* of the upper portion 88 extends through the lower opening 20. The lower portion 89 secures the upper portion 88. The sleeve assembly 85 includes a central opening 89 through which the pull rod 86 extends. The sleeve assembly 85 includes a seat portion 90 in which the lower end of the upper threaded member 58 is seated. A non-threaded portion of the upper threaded member 58 may extend through or into the central opening 91 in the snap grommet or sleeve assembly. The central opening 91 may extend all the way through the sleeve assembly or partially therethrough (e.g., a cap may be on the bottom side of the sleeve assembly). This relationship allows the upper threaded member 58 to be rotated on the seat portion 90 and with respect to the sleeve assembly 85 or vice versa. The snap grommet is not a limitation on the present invention and any type of sleeve assembly or arrangement that allows the pull rod to extend therethrough and that includes a seat portion to receive the lower end of the upper threaded member is within the scope of the invention. Because the upper threaded member 58 is not internally threaded, the upper threaded member 58 also rotates with respect to the pull rod 86. However, because of the threaded relationship between the upper threaded member 58 and the upper threaded receiver 22, similar to the upper threaded member 70 in the above embodiment, the upper drum head member 12 can be tensioned as desired by moving it upwardly or downwardly with respect to the lower drum head member 16.

The pull rod 86 of the hi-hat stand extends through the central opening 91 in the sleeve assembly and into and through the axial opening 62 in the upper threaded rod 58. Preferably, the upper threaded rod 58 includes a lateral opening 64 (that may or may not be threaded) extending through the wall thereof. An internally threaded sleeve 65 that includes a wing screw 63 extending through a threaded opening 66 in a wall thereof may be threadedly received on the upper threaded rod 58. The wing screw 63 may be aligned with and extend through the lateral opening 64 and is secured against the pull rod during use. The internally threaded sleeve 65 and wing screw 63 together may be referred to herein as a securing assembly 67. The wing screw 63 can be loosened to allow the pull rod to be taken out of the axially extending opening 62 and to take the drum assembly 84 off of the pull rod. With the securing assembly secured to the upper threaded rod 58 and the wing screw 63 secured against the hi-hat pull rod 86, the entire securing assembly 67 and hi-hat pull rod 86 may be rotated to tension the upper drum head assembly 12.

A bottom cymbal 71 is positioned below the lower drum head assembly 16, as shown in FIG. 7. Preferably, the bottom cymbal 71 rests against the lower drum head member 16 during use. The bottom cymbal 71 against the mesh or soft membrane material of the lower drum head member 16 provides quiet play during use.

It will be appreciated that the tensioning aspect of the embodiment described with respect to the hi-hat in FIGS. 7-8 can be used with a non hi-hat embodiment or with a regular cymbal or drum assembly. For example, in another embodiment, a ferrule, eyelet, snap grommet, or the like (the sleeve member 85) may be attached at or around the center of the upper mesh membrane 12 (as opposed to the lower mesh membrane, as shown in FIG. 7). This allows the threaded rod 14 to push against the sleeve member 85, causing it to increase the mesh tension and reduce or increase its deflection. In this embodiment, the sleeve member is not threaded and the only threaded connection is the threaded rod 14 with the lower threaded receiver 23. Therefore, if the entire frame 24 is rotated clockwise (with a right handed thread) on the threaded rod 14, due to the threaded relationship of the lower threaded receiver 23 and the threaded rod 14, the lower threaded receiver 23 will travel downwardly on the threaded rod 14. In turn, the upper end of the threaded rod 14 will push upwardly on and tension the upper membrane 12 as the upper end of the threaded rod 14 rotates within the non-threaded receiver member 32.

Figure 9:
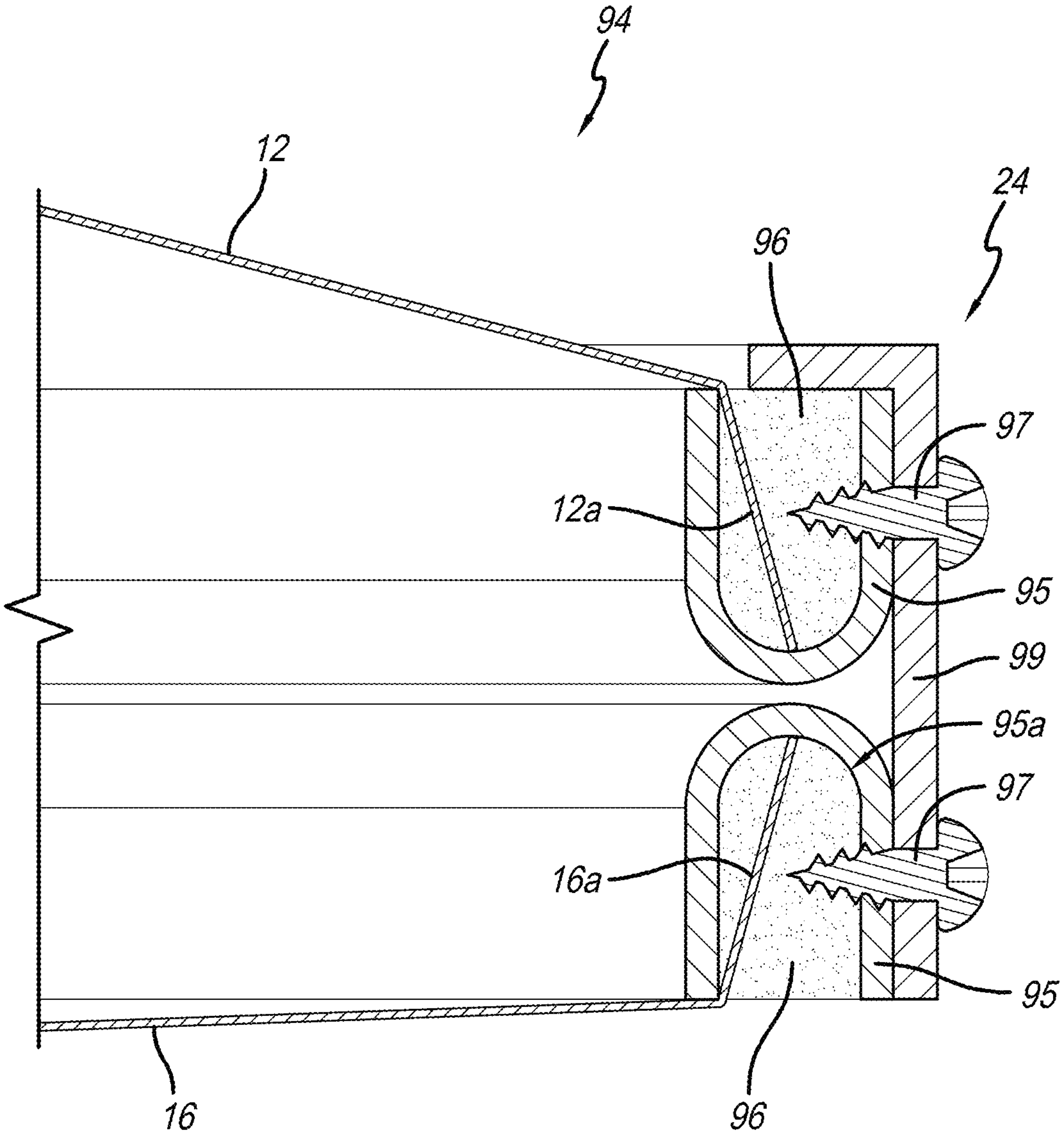
FIG. 9 is a cross-sectional perspective view of a drum assembly in accordance with a preferred embodiment of the present invention.

FIG. 9 shows a drum assembly 94 that is created using separate U-shaped hoops 95 that are held together with a steel securing member 99 to create the frame assembly 24. The outer circumference portion 12*a* of the upper drum head member 12 is secured via adhesive 96 (e.g., resin or glue) in the interior 95*a* of the upper U-shaped hoop 95 and the outer circumference portion 16*a* of the lower drum head member 16 is secured via adhesive 96 (e.g., resin or glue) in the interior 95*a* of the lower U-shaped hoop 95. These assemblies can be formed separately. Screws 97 or other threaded fasteners (or non-threaded fasteners, such as rivets, nails) are used to connect and secure the steel securing member 99 (the type of metal is not a limitation and anything can be used) to each of the U-shaped hoops. This drum assembly 94 can be utilized within any of the threaded member assemblies or arrangements discussed herein. Many of the embodiments described herein include threaded engagement between the upper receiver member and a portion of the threaded member assembly (e.g., the upper threaded member) and rotation of the portion of the threaded member assembly (e.g., the upper threaded member) causes the upper drum head member to move upwardly and away from the lower drum head member (creating space therebetween), thus providing tension in the upper drum head member. It will be appreciated that this arrangement can be reversed and it can be interaction of a portion of the threaded member assembly with the lower receiver member that provides tensioning.

Figure 10:
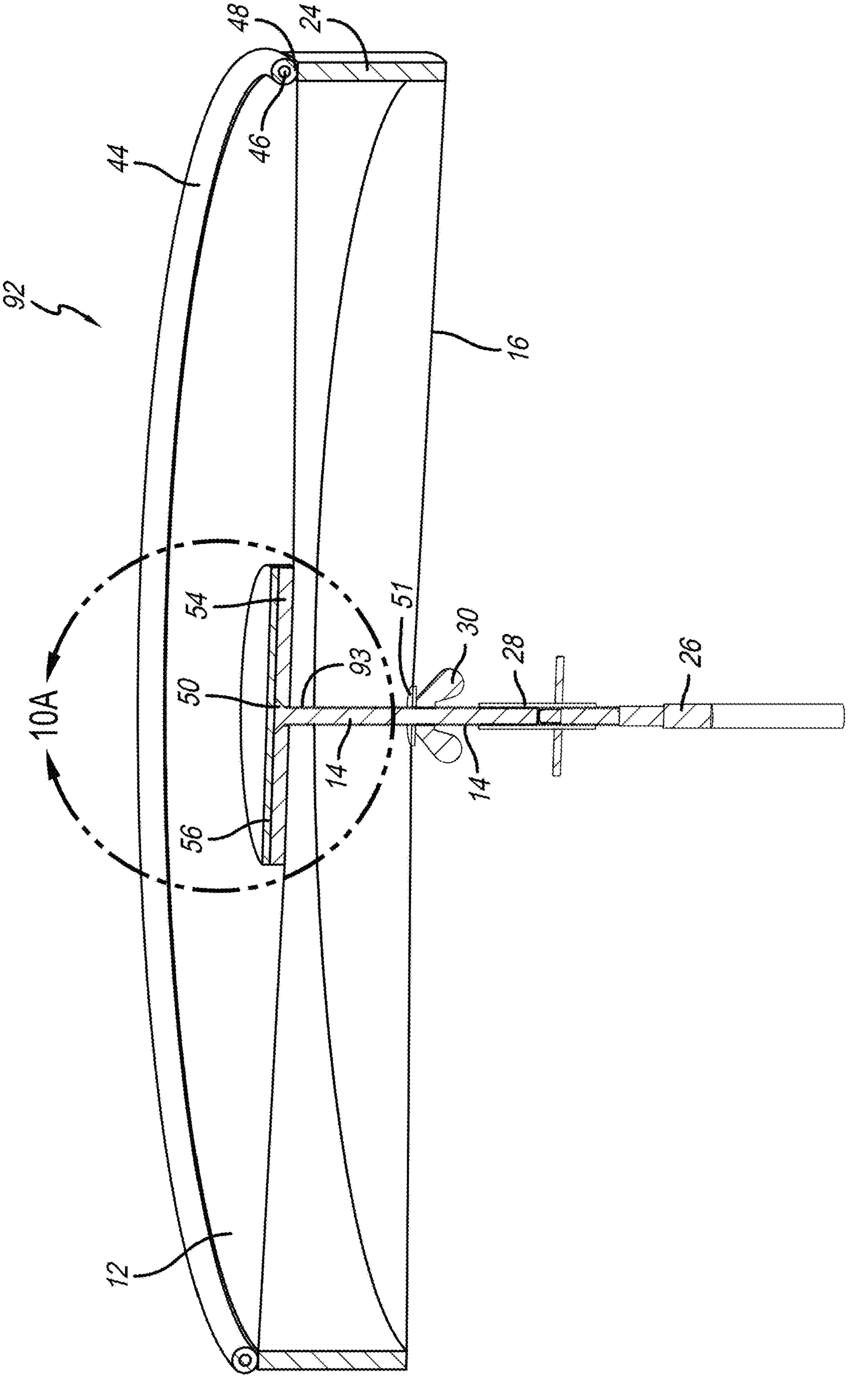
FIG. 10 is a cross-sectional perspective view of a drum assembly in accordance with a preferred embodiment of the present invention.
Figure 10A:
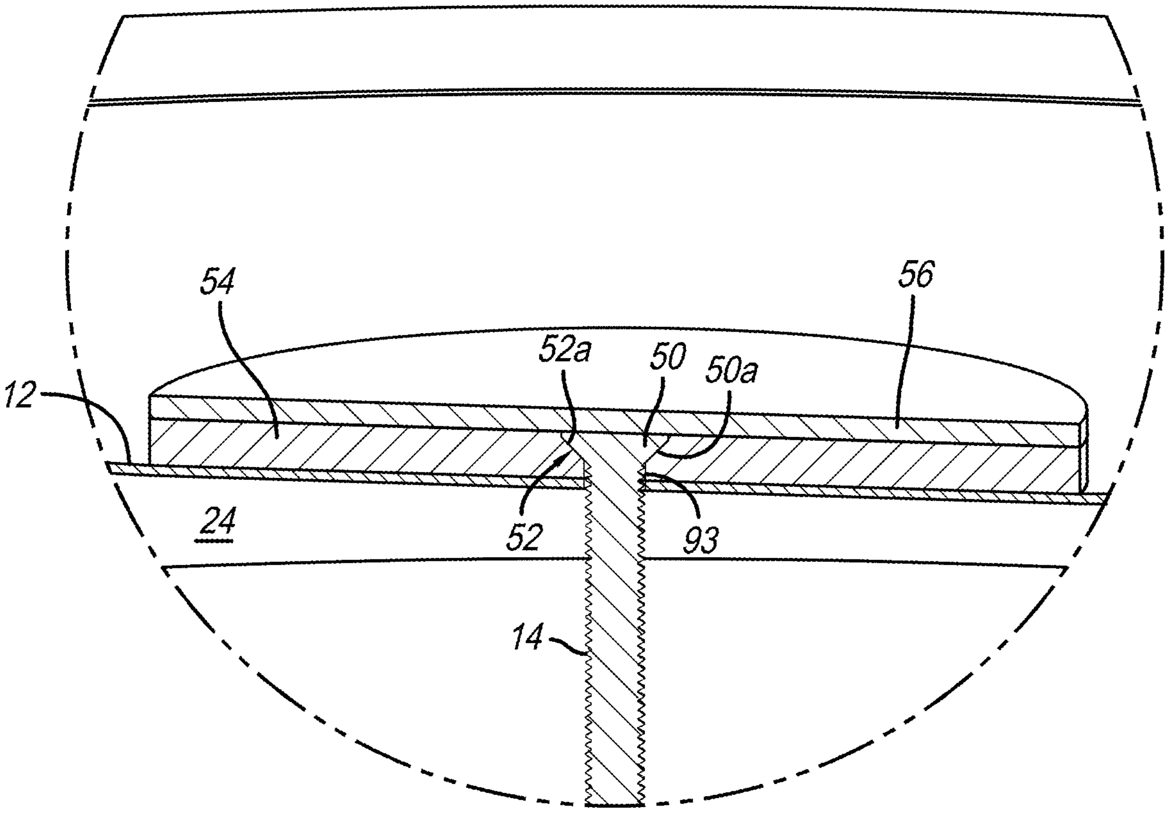
FIG. 10A is a detail view taken along line 10A-10A of FIG. 10.

FIG. 10 shows another embodiment of a drum assembly 92 where the upper drum head member or membrane 12 is pulled downwardly or compressed, instead of being tensioned or pushed upwardly. In this embodiment, the upper and lower drum head members are secured to a frame member 24 that is a hollow hoop or tube. However, this is not a limitation and this tensioning system or method can be used with any embodiment herein. The threaded member assembly 14 includes a head 50 thereon that mates with an indentation 52 defined in a plate 54 that is secured to the upper drum head member 12. The threaded member assembly or rod 14 extends through an opening 93 defined in the plate or the plate may be the head of the rod. The head 50 and indentation 52 include mating tapered edges 50*a* and 52*a* or the mating surfaces may be flat. The nut member or wing nut 30 adjacent the lower drum head member 16 can be rotated on the threads on the threaded rod 14 against a washer 51 or other surface, thus pushing upwardly on the lower membrane and pulling the head 50 downwardly against the plate 54, due to the relationship between the head 50 with a larger circumference than the opening 93 in the plate 54, and pulling the upper drum head member 12 downwardly to tension the upper drum head member 12.

In another embodiment, a lower threaded receiver may be on the lower drum head member and rotation of the threaded rod assembly within the lower threaded receiver may pull the upper drum head member downwardly (and provide compression/tension thereon). The plate 54 may include a rubber disc 56 thereon so that it can played similar to the bell of a cymbal. This embodiment may be used as a practice or electric drum or cymbal. The embodiment shown in the figures includes an edge member 44 so that the edge may be played like the edge of a cymbal. An edge member 44 may be included that extends around the top upper edge or circumference of the upper membrane 12 and the frame 24. The edge member 44 may be a steel or metal ring 46 covered with a rubber sleeve 48 so that it bounces in a similar fashion to that of a regular cymbal and where the load of the stick impact is spread around the ring to prevents dents in the drumshell or frame. When tensioning, tension is created by pulling the two membranes together as opposed to pulling them apart. Tightening the wingnut 30 from the bottom side pulls the upper and lower drum heads together. The suspension, movement, and self-righting action is the same or similar as when the tension is created by moving the upper and lower drum heads (or one of them) in opposite directions. This embodiment retains the same basic areas of a cymbal, which are bell, bow, and edge but with a relatively flat look and a center playing area without a protruding stem.

Figure 11:
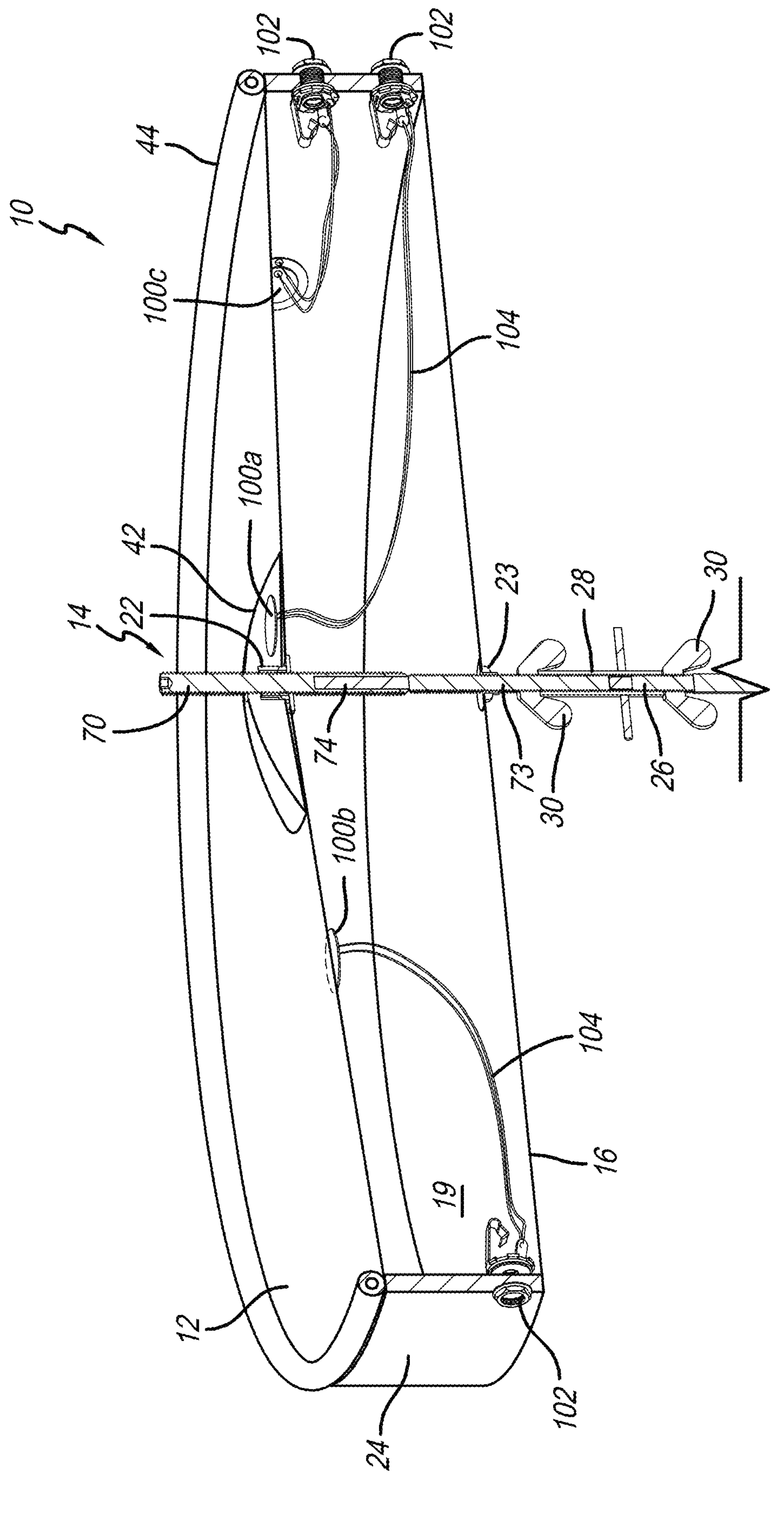
FIG. 11 is a cross-sectional perspective view of a drum assembly including sensors thereon.

Any of the various drum assemblies discussed or described herein can use triggers or sensors or the like to create an electronic drum or cymbal. For example, the different sensors and the like can be associated with different sounds or noises associated with a drum, cymbal, bow, bell, rim, edge and any different area of drums, cymbals and percussion instruments. FIG. 11 shows exemplary positions of triggers or sensors (e.g., piezo sensors) that can be used for an electronic drum or cymbal. Electronic drums generally may use piezo elements to detect various areas and levels of impact. Piezo trigger systems can be placed so that they come in contact with the center disc (bell area-see exemplary trigger or sensor 100*a*), the mesh drum head (bow area-see exemplary trigger or sensor 100*b*), and rubber covered steel ring (edge area-see exemplary trigger or sensor 100*c*). Since the stem post, mesh head, and drum frame are mostly isolated from each, they can be independent trigger points. FIG. 11 also shows a plurality of jacks 102 associated with each of the sensors or triggers. The jacks can electrically connect the sensors or triggers to output devices, such as a speaker or headphones. It will be appreciated that the electronic pick-up or sensor or trigger aspect or system is not to piezo. Other types of sensors or triggers are within the scope of the present invention. For example, a spring clamp mount (similar to a large binder clip) that quickly attaches to the edge of the drum head shown in FIG. 1 can include one or more triggers or sensors. This can be attached quickly to allow a user to add sound when desired. Velcro can also be utilized to quickly attach sensors or triggers where and when desired. For example, to the bell, bow and frame areas.

It will be appreciated that the threaded rod can be anchored below the top membrane on a solid disc, a ring, bridge assembly, or on another membrane attached to the bottom of the drum shell or anywhere below the upper membrane. For example, the lower drum head member may be omitted, as long as tension is provided by pushing upwardly on the upper drum head member or mesh member. The threaded rod or an extension thereof may also be attached to the sidewall of the drumshell or frame or be a part of a stand, such as a snare stand, that holds the drum in place. The contact of the threaded rod with the upper drum head member allows the tension on the upper drum head member to be adjusted. In one embodiment, to mount the drum assembly 10 an extended threaded rod or arm 26 of a cymbal stand or the like can push up and create tension against the top head by simply rotating the entire drum on the lower threaded receiver.

Unless the context clearly requires otherwise, throughout the description and the claims, the words “comprise,” “comprising,” and the like are to be construed in an inclusive sense, as opposed to an exclusive or exhaustive sense; that is to say, in the sense of “including, but not limited to.” As used herein, the terms “connected,” “coupled,” or any variant thereof, means any connection or coupling, either direct or indirect, between two or more elements; the coupling of connection between the elements can be physical, logical, or a combination thereof. Additionally, the words “herein,” “above,” “below,” and words of similar import, when used in this application, shall refer to this application as a whole and not to any particular portions of this application. Where the context permits, words in the above Detailed Description of the Preferred Embodiments using the singular or plural number may also include the plural or singular number respectively. The word “or” in reference to a list of two or more items, covers all of the following interpretations of the word: any of the items in the list, all of the items in the list, and any combination of the items in the list.

The above-detailed description of embodiments of the disclosure is not intended to be exhaustive or to limit the teachings to the precise form disclosed above. While specific embodiments of and examples for the disclosure are described above for illustrative purposes, various equivalent modifications are possible within the scope of the disclosure, as those skilled in the relevant art will recognize. Further, any specific numbers noted herein are only examples: alternative implementations may employ differing values, measurements or ranges.

Although the operations of any method(s) disclosed or described herein either explicitly or implicitly are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

The teachings of the disclosure provided herein can be applied to other systems, not necessarily the system described above. The elements and acts of the various embodiments described above can be combined to provide further embodiments. Any measurements or dimensions described or used herein are merely exemplary and not a limitation on the present invention. Other measurements or dimensions are within the scope of the invention.

Any patents and applications and other references noted above, including any that may be listed in accompanying filing papers, are incorporated herein by reference in their entirety. Aspects of the disclosure can be modified, if necessary, to employ the systems, functions, and concepts of the various references described above to provide yet further embodiments of the disclosure.

These and other changes can be made to the disclosure in light of the above Detailed Description of the Preferred Embodiments. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features or aspects of the disclosure with which that terminology is associated. In general, the terms used in the following claims should not be construed to limit the disclosures to the specific embodiments disclosed in the specification unless the above Detailed Description of the Preferred Embodiments section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. § 112, ¶6, other aspects may likewise be embodied as a means-plus-function claim, or in other forms, such as being embodied in a computer-readable medium. (Any claims intended to be treated under 35 U.S.C. § 112, ¶6 will include the words "means for"). Accordingly, the applicant reserves the right to add additional claims after filing the application to pursue such additional claim forms for other aspects of the disclosure.

Accordingly, although exemplary embodiments of the invention have been shown and described, it is to be understood that all the terms used herein are descriptive rather than limiting, and that many changes, modifications, and substitutions may be made by one having ordinary skill in the art without departing from the spirit and scope of the invention.

What is claimed is:

1. A drum assembly comprising:

a circular frame member that defines a frame opening therein, an upper drum head member secured to the frame member and spanning the frame opening, a lower drum head member positioned below the upper drum head member, secured to the frame member and spanning the frame opening, and a threaded rod assembly extending between the upper drum head member and the lower drum head member, wherein the threaded rod assembly includes an upper threaded member that is threadingly engaged with the upper drum head member, and wherein rotation of the upper threaded member in a predetermined direction moves the upper drum head member away from the lower drum head member, whereby tension is increased in the upper drum head member.

2. The drum assembly of claim 1 wherein the upper drum head member includes an upper opening defined therein, wherein the upper opening includes an upper threaded receiver, wherein the upper threaded member is threadingly engaged with the upper threaded receiver.

3. The drum assembly of claim 2 wherein the threaded rod assembly includes a lower threaded member, wherein the lower drum head member includes a lower opening defined therein, wherein the lower opening includes a lower threaded receiver, wherein the lower threaded member is threadingly engaged with the lower threaded receiver, wherein the upper threaded member is rotatable with respect to the lower threaded member.

4. The drum assembly of claim 3 wherein one of the upper threaded member and the lower threaded member includes a protrusion portion, wherein the other of the upper threaded member and the lower threaded member includes an axial bore, wherein the protrusion portion is received in the axial bore.

5. The drum assembly of claim 3 wherein the threaded member assembly includes a coupling nut, wherein a threaded portion of the lower threaded member is threadingly engaged with the coupling nut, and wherein the coupling nut is configured to receive a threaded post of a cymbal stand.

6. The drum assembly of claim 3 further comprising a cap member received on the upper threaded member and positioned above the upper drum head member.

7. The drum assembly of claim 1 wherein the upper drum head member includes outer circumference portion, wherein the lower drum head member includes an outer circumference portion, wherein the frame member defines a hoop channel that includes a ring member therein, wherein the outer circumference portion of the upper drum head member and the outer circumference portion of the lower drum head member are received in the hoop channel and at least partially surround the ring member.

8. The drum assembly of claim 7 wherein the frame member includes an inner wall, a bottom wall, an outer wall and an upper wall that cooperate to at least partially define the hoop channel, wherein a gap is defined between the inner wall and the upper wall, and wherein the upper drum head member and lower drum head member extend through the gap an into the hoop channel.

9. The drum assembly of claim 2 wherein the lower drum head member includes a sleeve assembly that includes a seat portion, wherein the upper threaded member is seated on the seat portion, wherein the upper threaded member is rotatable with respect to the sleeve assembly.

10. The drum assembly of claim 9 wherein the lower drum head member includes a lower opening defined therein, wherein the lower opening includes at least a portion of the sleeve assembly extending therethrough.

11. The drum assembly of claim 10 wherein the upper threaded member is tubular and includes an axial opening extending therethrough, wherein a hi-hat pull rod path is defined through a central opening in the sleeve assembly and through the axial opening of the upper threaded member, wherein the hi-hat pull rod path is configured to receive a hi-hat pull rod.

12. The drum assembly of claim 11 wherein the upper threaded member includes a lateral opening extending through a wall thereof, whereby the lateral opening is configured to receive a screw and to secure the upper threaded member to the hi-hat pull rod.

13. The drum assembly of claim 11 wherein the upper threaded member includes an internally threaded sleeve thereon, wherein the internally threaded sleeve includes a threaded opening defined in a wall thereof, wherein the upper threaded member includes a lateral opening extending through a wall thereof, wherein a screw extends through the threaded opening in the wall of the internally threaded sleeve and through the lateral opening in the upper threaded member, wherein the screw is configured to secure the upper threaded member to the hi-hat pull rod.

14. The drum assembly of claim 1 wherein the upper drum head member includes an outer circumference portion and the lower drum head member includes an outer circumference portion, wherein the frame member includes first and second U-shaped hoops, wherein the outer circumference portion of the upper drum head member is received in and secured in an interior of the first U-shaped hoop, wherein the outer circumference portion of the lower drum head member is received in and secured in an interior of the second U-shaped hoop, wherein the first and second U-shaped hoops are secured together by a securing member.

15. A method of providing tension on an upper drum head member of a drum assembly, the method comprising the steps of:

obtaining the drum assembly, wherein the drum assembly includes the upper drum head member and a lower drum head member positioned below the upper drum head member, wherein the upper and lower drum head members are secured to a frame member and span a frame opening, wherein a threaded rod assembly extends between the upper drum head member and the lower drum head member, and wherein the threaded rod assembly includes an upper threaded member that is threadingly engaged with the upper drum head member, and rotating the upper threaded member, such that the upper drum head member moves away from the lower drum head member, whereby tension is increased in the upper drum head member.

16. The method of claim 15 wherein the threaded rod assembly includes a lower threaded rod that is matingly engaged with the upper threaded rod, and wherein the upper threaded rod is rotated with respect to the lower threaded rod.

17. The method of claim 15 wherein the lower drum head member includes a sleeve assembly, wherein the upper threaded rod is seated on the sleeve assembly, and wherein the upper threaded rod is rotated with respect to the sleeve assembly.

18. A drum assembly comprising:

a circular frame member that defines a frame opening therein, an upper drum head member secured to the frame member and spanning the frame opening, a lower drum head member positioned below the upper drum head member, secured to the frame member and spanning the frame opening, a threaded rod assembly extending between the upper drum head member and the lower drum head member, wherein the threaded rod assembly extends downwardly through a lower opening defined in the lower drum head member, wherein a nut member is received on the threaded rod assembly below the lower drum head member, wherein rotation of the nut member against the lower drum head member pulls the upper drum head member downwardly.

19. The drum assembly of claim 18 further comprising a plate member positioned above the upper drum head member, wherein the plate member includes an opening defined therethrough, wherein the threaded rod assembly includes a head, wherein the threaded rod assembly extends through the opening defined in the plate and the head contacts the plate.

20. The drum assembly of claim 19 wherein the head of the threaded rod assembly is seated in an indentation defined in the plate member.

* * * * *